(12) United States Patent
Lim

(10) Patent No.: US 7,962,032 B2
(45) Date of Patent: Jun. 14, 2011

(54) PORTABLE COMPOSITE APPARATUS AND METHOD OF CONTROLLING PHOTOGRAPHING MODES

(75) Inventor: Chae-hoon Lim, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 325 days.

(21) Appl. No.: 11/688,293

(22) Filed: Mar. 20, 2007

(65) Prior Publication Data

US 2008/0089677 A1    Apr. 17, 2008

(30) Foreign Application Priority Data

Oct. 13, 2006   (KR) .................... 10-2006-0099868

(51) Int. Cl.
*G03B 7/00* (2006.01)
*G03B 7/087* (2006.01)
(52) U.S. Cl. ...................................... 396/213; 396/242
(58) Field of Classification Search .................. 396/213, 396/236, 238, 242, 243; 348/220.1, 221.1
See application file for complete search history.

(56) References Cited

U.S. PATENT DOCUMENTS

| | | | | |
|---|---|---|---|---|
| 5,086,314 | A | * | 2/1992 | Aoki et al. ................. 396/61 |
| 5,432,571 | A | * | 7/1995 | Aoki et al. ................. 396/318 |
| 5,606,391 | A | * | 2/1997 | Aoki et al. ................. 396/48 |
| 2006/0192879 | A1 | | 8/2006 | Hisamatsu |

FOREIGN PATENT DOCUMENTS

| | | |
|---|---|---|
| CN | 1248129 | 3/2000 |
| CN | 1506742 | 6/2004 |
| JP | 2004336326 | 11/2004 |
| KR | 2005-116197 | 12/2005 |
| KR | 2006-39058 | 5/2006 |

OTHER PUBLICATIONS

CN Office Action issued Mar. 20, 2009 in CN Application No. 200710136657.0.
European Search Report issued Jul. 22, 2009 in EP Application No. 07108648.2.

* cited by examiner

*Primary Examiner* — Rodney E Fuller
(74) *Attorney, Agent, or Firm* — Stanzione & Kim, LLP

(57) ABSTRACT

A portable composite apparatus and a method of controlling photographing modes. The portable composite apparatus includes a decision unit to decide whether current time information is included in a time range corresponding to a current photographing mode by referring to a prestored time information table, and an operation control unit to change priority levels of photographing modes based on the decision result from the decision unit and the time information table. As photographing modes of the portable composite apparatus are prioritized differently based on the current time information and the time information table, user convenience and expedition of operating (or setting) a desired photographing mode can be enhanced.

17 Claims, 3 Drawing Sheets

FIG. 2

| TIME RANGE | PHOTOGRAPHING MODE INFORMATION | PRIORITY LEVELS CORRESPONDING TO PHOTOGRAPHING MODES |
|---|---|---|
| 2:01~7:00 | DAWN | AUTO>MANUAL>Dawn>Portrait>Children>Landscape>Close up>Back light>Beach/Snow>Night... |
| 7:01~12:00 | MORNING/NOON | Auto>Manual>Portrait>Children>Landscape>Close up>Back light>Beach/Snow>Dawn>Night... |
| 12:01~17:59 | AFTERNOON | Auto>Manual>Sunset>Portrait>Children>Landscape>Close up>Back light>Beach/Snow>Dawn>Night... |
| 18:00~2:00 | NIGHT | Auto>Manual>Night>Fireworks>Portrait>Children>Landscape>Close up>Back light>Beach/Snow... |

PORTABLE COMPOSITE APPARATUS AND METHOD OF CONTROLLING PHOTOGRAPHING MODES

CROSS-REFERENCE TO RELATED APPLICATIONS

This application claims priority under 35 U.S.C. §119 (a) from Korean Patent Application No. 10-2006-0099868, filed on Oct. 13, 2006, in the Korean Intellectual Property Office, the entire disclosure of which is hereby incorporated by reference.

BACKGROUND OF THE INVENTION

1. Field of the Invention

The present general inventive concept relates to a portable composite apparatus and a method of controlling photographing modes. More particularly, the present general inventive concept relates to a portable composite apparatus and a method of controlling photographing modes by setting different priority levels based on a current time of the portable composite apparatus and a time information table.

2. Description of the Related Art

A portable composite apparatus has a variety of functions of a camcorder, a digital camera, an MP3 player, a voice recorder, a data storage device, a web camera, etc., and is manufactured in a small size to allow a user to carry the portable apparatus during use. Recent growth in digital technologies has opened up the possibility of integrating such a portable composite apparatus into an image processing apparatus such as a camcorder.

Portable composite apparatuses have become increasingly popular and the needs of users for photographing modes supported in the portable composite apparatus are also diverse and increasing.

Unfortunately however, portable composite apparatuses in the art have set a fixed sequence of photographing modes in the photographing mode selection menu. As such, users have to spend much time to select a desired photographing mode and may also suffer inconvenience in using it because the photographing modes do not consider differences in time variant photographing environments.

SUMMARY OF THE INVENTION

The present general inventive concept provides a portable composite apparatus and a method of controlling photographing modes by setting different priority levels based on a current time of the portable composite apparatus and a time information table.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a portable composite apparatus, including a decision unit to decide by referring to a prestored time information table whether current time information is included in a time range corresponding to a current photographing mode, and an operation control unit to change priority levels corresponding to photographing modes on the basis of the decision result from the decision unit and of the time information table.

The operation control unit may change the priority levels corresponding to the photographing modes to sequence photographing modes in a photographing mode setting menu in accordance with the priority levels corresponding to the photographing modes, and may sequence a toggle sequence of shortcut icons of photographing modes in accordance with the priority levels corresponding to the photographing modes through a shortcut operation on a screen being photographed.

The decision unit may decide whether the current photographing mode is a basic mode, and the operation control unit may change the current photographing mode to the basic mode, if the decision unit has decided that a current time information is not included in a time range corresponding to the current photographing mode and that the current photographing mode is not the basic mode.

If the decision unit has decided that the current photographing mode is the basic mode, the operation control unit may control the current photographing mode to be the basic mode without any change and changes by referring to the time information table the priority levels corresponding to the photographing modes to the priority levels corresponding to the photographing modes corresponding to the time range which includes the current time information.

The time information table may contain the time range, the photographing mode information, and the priority levels corresponding to the photographing modes, the photographing mode information including at least one of dawn, morning/noon, afternoon, and night, and the basic mode including at least one of auto mode and manual mode.

The portable composite apparatus may further include a time information providing unit to output the current time information by using a real-time clock IC or an oscillator.

If the priority levels corresponding to the photographing modes are changed, the operation control unit controls at least one of message and icon to be displayed to notify that photographing mode information corresponding to the priority levels corresponding to the photographing modes have been changed.

The foregoing and/or other aspects and utilities of the present general inventive concept may also be achieved by providing a method of controlling photographing modes includes deciding by referring to a prestored time information table whether current time information is included in a time range corresponding to a current photographing mode, and changing priority levels corresponding to the photographing modes on the basis of the decision result and the time information table.

The changing step may involve changing the priority levels corresponding to the photographing modes to control photographing modes in a photographing mode setting menu to be sequenced in accordance with the priority levels corresponding to the photographing mode, and controlling a toggle sequence of shortcut icons of photographing modes to be sequenced in accordance with the priority levels corresponding to the photographing modes through a shortcut operation on a screen being photographed.

The deciding step may involve deciding whether the current photographing mode is a basic mode, and the changing step involves changing the current photographing mode to the basic mode, if the decision has been made that a current time information is not included in a time range corresponding to the current photographing mode and that the current photographing mode is not the basic mode.

If the decision has been made that the current photographing mode is the basic mode, the changing step may involve controlling the current photographing mode to be the basic mode without any change and changing, in reference to the time information table, the priority levels corresponding to the photographing modes to the priority levels corresponding to the photographing modes corresponding to the time range which includes the current time information.

The time information table contains the time range, the photographing mode information, and the priority levels of the photographing modes, the photographing mode information including at least one of dawn, morning/noon, afternoon, and night, and the basic mode including at least one of auto mode and manual mode.

The method of controlling the photographing modes may further include: outputting the current time information by using a real-time clock IC or an oscillator.

If the priority levels of the photographing modes are changed, the changing step may involve controlling at least one of message and icon to be displayed to notify that the photographing mode information corresponding to the priority levels of the photographing modes have been changed.

The foregoing and/or other aspects and utilities of the present general inventive concept may also be achieved by providing a portable composite apparatus, including a storage unit to store a time information table, a time information providing unit to output current time information, and a control unit to set photographing modes in the portable composite apparatus with reference to the current time information received from the time information providing unit and the time information table in the storage unit to determine priority levels corresponding to the photographing modes.

The time information table may include a time range, photographing mode information including at least one of dawn, morning/noon, afternoon, and night, and a plurality of priority levels corresponding to the photographing modes.

The time information providing unit may include an internal clock to generate the current time information.

The foregoing and/or other aspects and utilities of the present general inventive concept may also be achieved by providing a method of controlling photographing modes, the method including storing a time information table in a storage unit, outputting current time information from a clock, and setting photographing modes in the portable composite apparatus with reference to the current time information and the time information table to determine priority levels corresponding to the photographing modes.

The time information table may include a time range, photographing mode information including at least one of dawn, morning/noon, afternoon, and night, and a plurality of priority levels corresponding to the photographing modes.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 2 illustrates a time information table supported in the portable composite apparatus of FIG. 1.

DETAILED DESCRIPTION OF THE PREFERRED EMBODIMENTS

Figure 1:
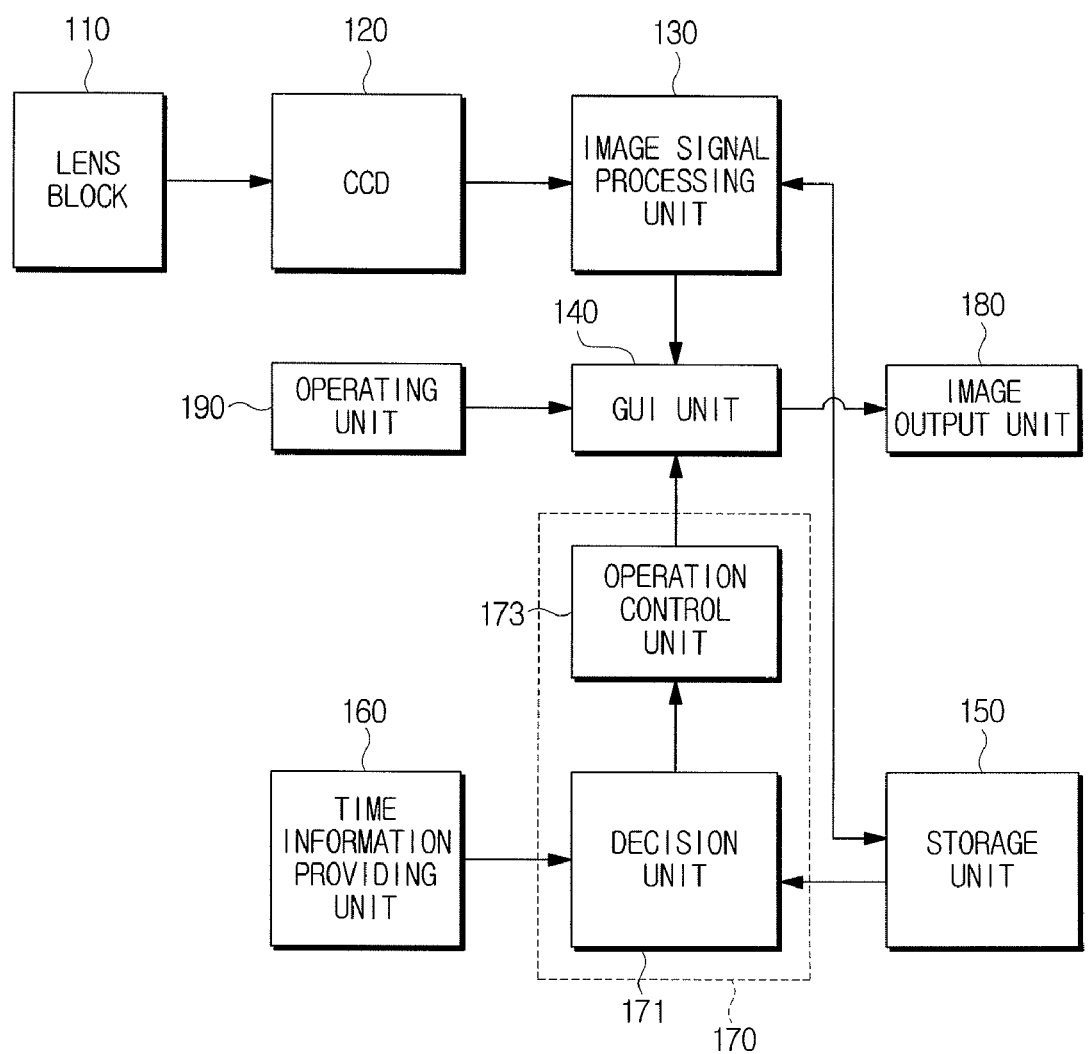
FIG. 1 is a schematic block diagram of a portable composite apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic block diagram of a portable composite apparatus according to an exemplary embodiment of the present general inventive concept, and FIG. 2 illustrates a time information table supported in the portable composite apparatus of FIG. 1. Referring to FIGS. 1 and 2, the portable composite apparatus includes a lens block 110, a CCD 120, an image processing unit 130, a GUI unit 140, a storage unit 150, a time information providing unit 160, a control unit 170, an image output unit 180, and an operating unit 190.

The lens block 110 may include by a zoom lens having the ability to vary its focal length to increase or decrease a size of a subject to be photographed, a focus lens to adjust a focus of the subject, and an iris to adjust an amount of light that enters the lens block 100. The lens block 100 receives an optical signal from an external subject.

The CCD 120 transforms the optical signal of the subject which is incident through the lens block 110 into an electronic signal, and outputs the photoelectrically transformed signal.

The image signal processing unit 130 receives an electric signal output from the CCD 120, and removes noises included in the electric input signal, controls a gain to maintain the signal level constant, and converts the signal output from the CCD 120 into a digital signal.

In addition, the image signal processing unit 130 separates the converted digital signal into a luminance signal and a chrominance signal, and performs a predetermined signal processing on the separated luminance signal and chrominance signal, respectively, to thereby adjust a luminance value and a chrominance value of the signals.

The Graphic User Interface (GUI) unit 140 is a means through which a user and the portable composite apparatus 100 interact with each other. The GUI unit 140 generates a GUI corresponding to a user command which is input manually through the operating unit 190, or a GUI corresponding to a user command which is input by selecting an icon or menu displayed on the image output unit 180, and displays the GUI on the image output unit 180.

The storage unit 150 may store a time information table, all programs necessary for an operation of the portable composite apparatus 100, image data from the image signal processing unit 130, etc. The time information table may contain information on photographing modes, a predetermined time range (or span) corresponding to the information on the photographing modes, and predetermined priority levels of the photographing modes. The information on the photographing modes may include at least one of dawn, morning/noon, afternoon, and night, and the time range and the priority levels of the photographing modes can be set up by an operation performed by the user.

The time information providing unit 160 is an internal clock installed inside the portable composite apparatus 100 which can output current time information. The current time information is generated by a clock signal provided by either a real-time clock IC or an oscillator.

The control unit 170 sets the photographing mode in the portable composite apparatus 100 with reference to the current time information received from the time information providing unit 160 and with reference to the time information table stored in the storage unit 150, and determines priority levels of the photographing modes. Accordingly, the control unit 170 may include a decision unit 171 and an operation control unit 173.

The decision unit 171 decides, while referring to the time information table stored in the storage unit 150, whether the current time information received from the time information providing unit 160 is included in the time range corresponding to a current photographing mode of the portable composite apparatus 100, and outputs the decision result.

If the decision unit 171 decides that the current time information was not included in the time range corresponding to the current photographing mode, the decision unit 171 then decides whether the current photographing mode is a basic mode and outputs the decision result. The basic mode may include at least one of an auto mode and a manual mode. In auto mode the user is not able to control parameter values to use when photographing, while in manual mode the user is able to control certain parameters such as flash, sensitivity, white balance, etc.

If the decision unit 171 decides that the current time information was included in the time range corresponding to the current photographing mode, the operation control unit 173 controls both the current photographing mode of the portable composite apparatus 100 and the priority levels corresponding to the photographing modes therein.

Moreover, if the decision unit 171 decides that the current time information was not included in the time range corresponding to the current photographing mode and that the current photographing mode was set to the basic mode, the operation control unit 173 controls the current photographing mode of the portable composite apparatus 100 to be the basic mode without any change. Also, the operation control unit 173 refers to the time information table to control the priority level of the current photographing mode to be changed to the priority level of the photographing mode corresponding to the time range that includes the current time information. That is to say, the operation control unit 173 changes a sequence of the photographing modes provided from the first to the last photographing mode in the menu to set the photographing mode, and controls the GUI unit 140 to output this change to the image output unit 180.

Further, if the decision unit 171 decides that the current time information was not included in the time range corresponding to the current photographing mode and that the current photographing mode was not set to the basic mode, the operation control unit 173 controls the current photographing mode of the portable composite apparatus 100 to be changed to the basic mode. Also, the operation control unit 173 refers to the time information table again to control the priority level of the current photographing mode of the portable composite apparatus 100 to be changed to the priority level of the photographing mode corresponding to the time range that includes the current time information.

At this time, if the priority level of the photographing mode has changed, the operation control unit 173 controls the GUI unit 140 to output a message and/or an icon to notify the user of the change in the photographing mode information in the image output unit 180. That is, when the priority level of the photographing mode has changed, the operation control unit 173 controls the GUI unit 140 to notify the user that the photographing mode information corresponding to the photographing mode priority level has been changed.

Figure 3:
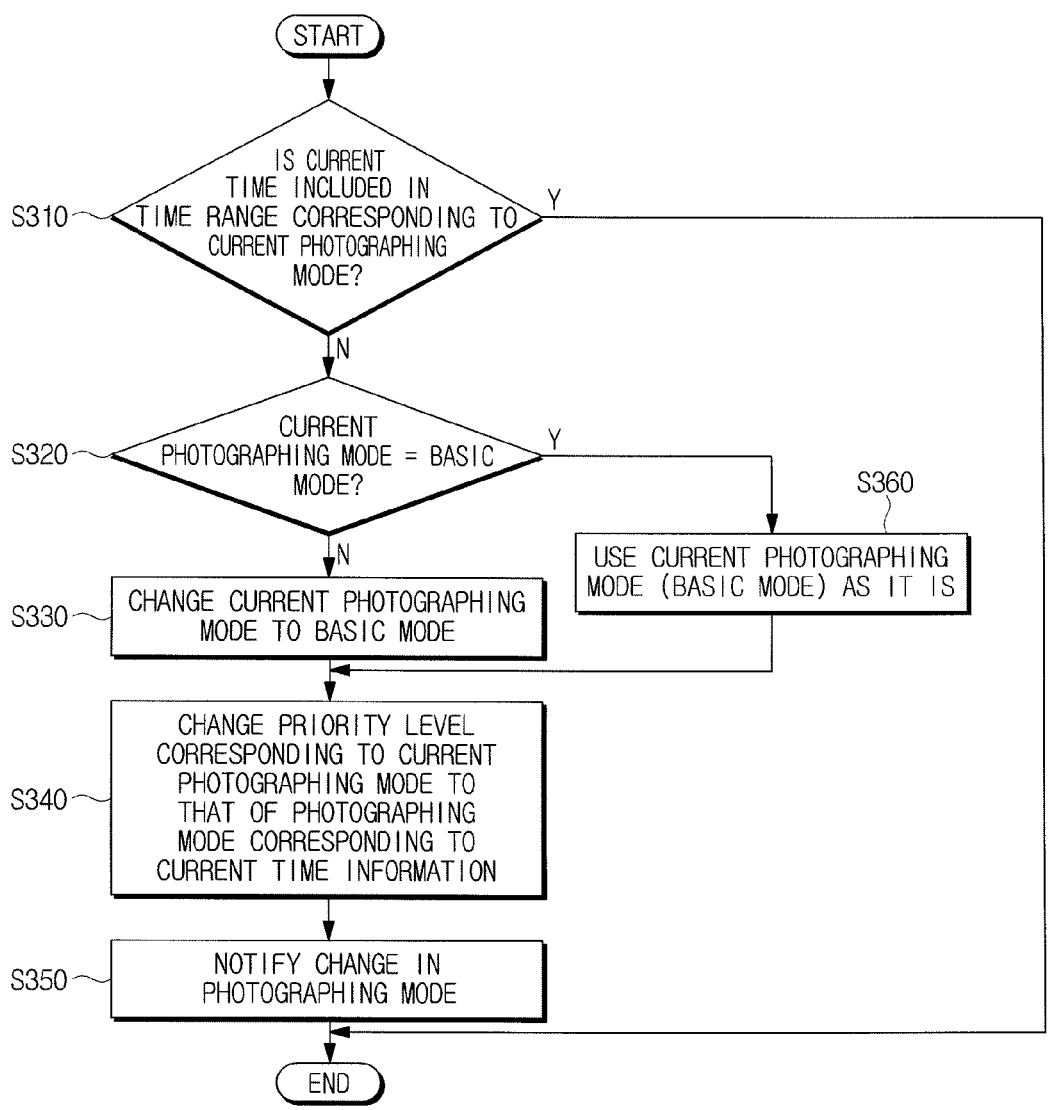
FIG. 3 is a flow chart illustrating how the portable composite apparatus of FIG. 1 operates.

FIG. 3 is a flow chart illustrating how the portable composite apparatus of FIG. 1 operates.

By referring to the time information table stored in the storage unit 150, the decision unit 171 can decide whether the current time information received from the time information providing unit 160 is included in the time range corresponding to the current photographing mode of the portable composite apparatus 100 in equation S310. If it is decided in the decision unit 171 that the current time information received from the time information providing unit 160 was included in the time range corresponding to the current photographing mode of the portable composite apparatus 100 (i.e., in operation S310:Y), the operation control unit 173 controls the current photographing mode of the portable composite apparatus 100 and the priority levels of photographing modes therein to be used as they are.

If the decision unit 171 decides that the current time information was not included in the time range corresponding to the current photographing mode (i.e., operation S310:N), the decision unit 171 decides whether the current photographing mode was set to the basic mode in operation S320. If the current photographing mode was indeed set to the basic mode, the operation control unit 173 controls the current photographing mode of the portable composite apparatus 100 to be the basic mode without any change, and controls, by referring to the time information table, the priority level of the current photographing mode to be changed to the priority level of the photographing mode corresponding to the time range that includes the current time information.

The basic mode may include at least one of an auto mode and a manual mode. In the auto mode, the user is not able to control parameter values to use during photographing. In the manual mode, the user is able to control certain parameters such as flash, sensitivity, white balance, etc.

If it is decided in the decision unit 171 that the current photographing mode has not been set to the basic mode (i.e., operation S320:N), the operation control unit 173 controls the current photographing mode of the portable composite apparatus 100 to be changed to the basic mode in operation S330.

By referring to the time information table again, the operation control unit 173 can control the priority level of the current photographing mode of the portable composite apparatus 100 to be changed to the priority level of the photographing mode corresponding to the time range that includes the current time information in operation S340. In other words, the operation control unit 173 sequences, based on the current time information, the photographing modes to be placed on the first to the last of a photographing mode setting menu to thereby change priority levels of photographing modes of the portable composite apparatus 100, and changes the sequence of changing icons of photographing modes to the sequence of the priority levels of photographing modes through an operation of shortcut buttons while shooting.

Referring to FIG. 2, if the photographing mode information of the portable composite apparatus 100 in power-off mode is "Night," the current photographing mode is set to "Night," and then the photographing mode information corresponding to the time range that includes the current time information in power-on mode is "Afternoon." Since the current photographing mode is "Night," which is not the basic mode, the operation control unit 173 changes the current photographing mode to the basic mode, and changes the priority level of the photographing mode from the priority level corresponding to the "Night" photographing mode to the priority level corresponding to the "Afternoon" photographing mode.

Namely, the operation control unit 173 sequences photographing modes output to the photographing mode setting menu from "Auto," "Manual," "Night," "Fireworks" . . . to "Auto," "Manual," "Dawn," "Portrait" . . . . At this time, the operation control unit 173 also changes the toggle sequence of icons corresponding to the photographing mode that is output to a screen being photographed from priority levels corresponding to the "Night" photographing mode to priority levels corresponding to the "Afternoon" photographing mode.

The operation control unit 173 notifies the change in the priority level of photographing modes to the user by outputting a message and/or icon indicating a change in the priority level in operation S350. When the photographing mode information corresponding to the time range that includes the current time information is "Afternoon," the operation control unit 173 controls the GUI unit 140 to output to the image output unit 180 at least one of message and icon notifying that the photographing mode information has changed from "Dawn" to "Afternoon," to thereby notify the change in photographing mode information to the user.

In the portable composite apparatus and the method of controlling photographing modes according to an embodiment of the present general inventive concept, the time information providing unit 160 may be installed separately from the control unit 170 or installed inside the control unit 170.

Moreover, in the portable composite apparatus and the method of controlling photographing modes according to an embodiment of the present general inventive concept, the decision unit 171 not only decides by referring to the time information table stored in the storage unit 150 whether the time range corresponding to the current photographing mode of the portable composite apparatus 100 includes the current time information, but also decides whether the photographing mode information corresponding to the time range that includes the current time information coincides with the current photographing mode of the portable composite apparatus 100, and outputs its decision results. Accordingly, the operation control unit 173 sets the current photographing mode of the portable composite apparatus 100 and the priority levels of photographing modes based on the decision results provided from the decision unit 171.

As described above, according to the embodiments of the present general inventive concept, photographing modes of a portable composite apparatus may be prioritized differently based on current time information and the time information table, to thereby enhance user convenience and expedition of operating (or setting) a desired photographing mode.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A portable composite apparatus, comprising:
   a decision unit to decide whether current time information is included in a time range corresponding to a current photographing mode by referring to a prestored time information table; and
   an operation control unit to change priority levels of a plurality of selectable photographing modes based on the decision result from the decision unit and the time information table,
   wherein the operation control unit changes the priority levels of the photographing modes to sequence the photographing modes in a photographing mode setting menu in accordance with the priority levels of the photographing modes, and sequences a toggle sequence of shortcut icons of the photographing modes in accordance with the priority levels of the photographing modes through a shortcut operation on a screen being photographed.

2. The apparatus of claim 1, wherein:
   the decision unit decides whether the current photographing mode is a basic mode; and
   the operation control unit changes the current photographing mode to the basic mode if the decision unit has decided that a current time information is not included in a time range corresponding to the current photographing mode and that the current photographing mode is not the basic mode.

3. The apparatus of claim 1, wherein, if the decision unit has decided that the current photographing mode is the basic mode, the operation control unit controls the current photographing mode to be the basic mode without any change, and by referring to the time information table, changes the priority levels of the photographing modes to the priority levels of the photographing modes corresponding to the time range which includes the current time information.

4. The apparatus of claim 1, wherein the time information table contains the time range, photographing mode information, and the priority levels of photographing modes, the photographing mode information including at least one of dawn, morning/noon, afternoon, and night, and a basic mode including at least one of auto mode and manual mode.

5. The apparatus of claim 1, further comprising:
   a time information providing unit to output the current time information by using a real-time clock IC or an oscillator.

6. The apparatus of claim 1, wherein if the priority levels of the photographing modes are changed, the operation control unit controls at least one of a message and a icon to be displayed to notify that photographing mode information corresponding to the priority levels of the photographing modes have been changed.

7. A method of controlling a photographing apparatus, comprising:
   deciding by referring to a prestored time information table whether current time information is included in a time range corresponding to a current photographing mode; and
   changing priority levels of a plurality of selectable photographing modes based on the decision result and the time information table,
   wherein the deciding operation involves deciding whether the current photographing mode is a basic mode, and the changing operation involves changing the current photographing mode to the basic mode, if the decision has been made that a current time information is not included it a time range corresponding to the current photographing mode and that the current photographing mode is not the basic mode.

8. The method of claim 7, wherein the changing operation involves changing the priority levels of photographing modes to control photographing modes in a photographing mode setting menu to be sequenced in accordance with the priority levels of the photographing modes, and controlling a toggle sequence of shortcut icons of the photographing modes to be sequenced in accordance with the priority levels of the photographing modes through a shortcut operation on a screen being photographed.

9. The method of claim 7, wherein, if the decision has been made that the current photographing mode is the basic mode, the changing operation involves controlling the current photographing mode to be the basic mode without any change and changing, in reference to the time information table, the priority levels of the photographing modes to the priority levels of the photographing modes corresponding to the time range which includes the current time information.

10. The method of claim 7, wherein the time information table contains the time range, the photographing mode information, and the priority levels of the photographing modes, the photographing mode information including at least one of dawn, morning/noon, afternoon, and night, and the basic mode including at least one of auto mode and manual mode.

11. The method of claim 7, further comprising:
outputting the current time information by using a real-time clock IC or an oscillator.

12. The method of claim 7, wherein if the priority levels of the photographing modes are changed, the changing operation involves controlling at least one of a message and an icon to be displayed to notify that photographing mode information corresponding to the priority levels of the photographing modes have been changed.

13. A portable composite apparatus, comprising:
a storage unit to store a time information table;
a time information providing unit to output current time information; and
a control unit to set photographing modes in the portable composite apparatus with reference to the current time information received from the time information providing unit and the time information table in the storage unit to determine priority levels of a plurality of selectable photographing modes corresponding to the photographing modes,
wherein the control unit determines whether a currently set photographing mode is a basic mode, and the control unit changes the current photographing mode to the basic mode if the control unit has determined that a current time information is not included in a time range corresponding to the current set photographing mode and that the current set photographing mode is not the basic mode.

14. The portable composite apparatus of claim 13, wherein the time information table comprises:
a time range;
photographing mode information including at least one of dawn, morning/noon, afternoon, and night; and
a plurality of priority levels corresponding to the photographing modes.

15. The portable composite apparatus of claim 13, wherein time information providing unit comprises:
an internal clock to generate the current time information.

16. A method of controlling photographing modes, the method comprising:
storing a time information table in a storage unit;
outputting current time information from a clock; and
setting photographing modes in the portable composite apparatus with reference to the current time information and the time information table to determine priority levels of a plurality of selectable photographing modes corresponding to the photographing modes,
wherein the setting photographing modes includes determining whether a currently set photographing mode is a basic mode, and changing the currently set photographing mode to the basic mode when it is determined that a current time information is not included in a time range corresponding to the currently set photographing mode and that the currently set photographing mode is not the basic mode.

17. The method of claim 16, wherein the time information table comprises:
a time range;
photographing mode information including at least one of dawn, morning/noon, afternoon, and night; and
a plurality of priority levels corresponding to the photographing modes.

* * * * *